(12) United States Patent
Yaoita et al.

(10) Patent No.: US 10,465,335 B2
(45) Date of Patent: Nov. 5, 2019

(54) POLYESTER RESIN, METHOD FOR PRODUCING POLYESTER RESIN, RESIN COMPOSITION, RESIN-CLAD FABRIC, AND METHOD FOR PRODUCING RESIN-CLAD FABRIC

(71) Applicant: DIC Corporation, Tokyo (JP)

(72) Inventors: Yoshiyuki Yaoita, Ichihara (JP); Osamu Suzuki, Ichihara (JP)

(73) Assignee: DIC Corporation, Tokyo (JP)

( * ) Notice: Subject to any disclaimer, the term of this patent is extended or adjusted under 35 U.S.C. 154(b) by 36 days.

(21) Appl. No.: 15/756,302

(22) PCT Filed: Aug. 19, 2016

(86) PCT No.: PCT/JP2016/074228
§ 371 (c)(1),
(2) Date: Feb. 28, 2018

(87) PCT Pub. No.: WO2017/038502
PCT Pub. Date: Mar. 9, 2017

(65) Prior Publication Data
US 2018/0251937 A1    Sep. 6, 2018

(30) Foreign Application Priority Data
Sep. 4, 2015   (JP) .................................. 2015-174810

(51) Int. Cl.
*C08K 3/013*       (2018.01)
*D06M 15/507*      (2006.01)
*C08L 67/03*       (2006.01)
*C08G 63/183*      (2006.01)

(52) U.S. Cl.
CPC ........... *D06M 15/507* (2013.01); *C08L 67/03* (2013.01); *C08G 63/183* (2013.01); *C08L 2203/12* (2013.01)

(58) Field of Classification Search
USPC .................................. 524/317; 528/196, 198
See application file for complete search history.

(56) References Cited

U.S. PATENT DOCUMENTS

| 4,942,219 A | 7/1990 | Yatsuka et al. |
| 7,211,634 B1 | 5/2007 | Martin et al. |
| 2016/0186005 A1 | 6/2016 | Kimiduka et al. |

FOREIGN PATENT DOCUMENTS

| CN | 103113560 A | 5/2013 |
| JP | 08-208830 A | 8/1996 |
| JP | 2002-212316 A | 7/2002 |
| JP | 2003-221496 A | 8/2003 |
| JP | 2008-013642 A | 1/2008 |
| JP | 2009-203592 A | 9/2009 |
| WO | 2015/001679 A1 | 3/2019 |

OTHER PUBLICATIONS

International Search Report dated Oct. 25, 2016, issued for PCT/JP2016/074228.
Search Report dated Mar. 6, 2019, issued for the European patent application No. 16841534.7.
Office Action dated Jun. 4, 2019, issued for the corresponding Chinese patent application No. 201680050953.6.

*Primary Examiner* — Terressa Boykin
(74) *Attorney, Agent, or Firm* — Locke Lord LLP

(57) ABSTRACT

In order to provide a polyester resin having excellent flexibility, transparency, solvent resistance, heat resistance, and water resistance and capable of being used for a protective layer of a fabric, and a resin-clad fabric obtained by forming a layer of the polyester resin on a fabric, the present invention provides a polyester resin including: a dicarboxylic acid residue; and a glycol residue, in which the dicarboxylic acid residue includes a terephthalic acid residue (a), an aliphatic dicarboxylic acid residue (b) having 6 to 12 carbon atoms, and a dimer acid residue or hydrogenated dimer acid residue (c), the glycol residue includes an ethylene glycol residue or diethylene glycol residue (d) and a branched aliphatic glycol residue (e) having 3 to 9 carbon atoms.

17 Claims, 2 Drawing Sheets

# POLYESTER RESIN, METHOD FOR PRODUCING POLYESTER RESIN, RESIN COMPOSITION, RESIN-CLAD FABRIC, AND METHOD FOR PRODUCING RESIN-CLAD FABRIC

TECHNICAL FIELD

The present invention relates to a polyester resin having excellent flexibility, transparency, solvent resistance, heat resistance, and water resistance, and capable of being suitably used in formation of a protective layer of a fabric, and a resin-clad fabric obtained by forming a layer obtained by using the polyester resin on a fabric.

BACKGROUND ART

As fabric materials of clothes, tents, bags, and the like, fabrics of polyester fibers or nylon fibers are widely used. In order to further improve waterproof properties, moisture permeation resistance, heat resistance, solvent resistance, and the like of these fabrics, solutions of an acrylic resin and a urethane resin are applied onto the fabric to form a layer of these resins on the fabric.

As a resin solution of a urethane resin for obtaining a fabric having excellent waterproof properties, for example, a solution of a polyurethane resin obtained by copolymerization of organopolysiloxane in which one terminal includes an isocyanate group and a non-reactive functional group and the other terminal includes two primary hydroxyl groups, organic diisocyanate, and polyol in which both terminals include hydroxyl groups is disclosed, and specifically, a solution of a polyurethane resin obtained by copolymerization of organopolysiloxane having an average molecular weight of 5,000, 1,4-butanediol adipate having an average molecular weight of 2,000, and 1,6-hexanediol is disclosed. However, a layer of the polyurethane resin has poor flexibility and a resin-clad fabric including this resin layer is difficult to be handled.

CITATION LIST

Patent Literature

[PTL 1] JP-A-2009-203592

SUMMARY OF INVENTION

Technical Problem

An object of the present invention is to provide a polyester resin having excellent flexibility, transparency, solvent resistance, heat resistance, and water resistance, and capable of being suitably used in formation of a protective layer of a fabric, a method for producing the polyester resin, and a composition including the polyester resin. In addition, another object of the present invention is to provide a resin-clad fabric including a layer of the polyester resin and a method for producing the same.

Solution to Problem

As a result of intensive studies for achieving the aforementioned objects, the inventors have found that a polyester resin including a terephthalic acid residue, an aliphatic dicarboxylic acid residue having 6 to 12 carbon atoms, a dimer acid residue or hydrogenated dimer acid residue, an ethylene glycol residue or diethylene glycol residue, and a branched aliphatic glycol residue having 3 to 9 carbon atoms in a main chain skeleton respectively in specific ranges, has excellent flexibility, transparency, solvent resistance, heat resistance, and water resistance, and can be suitably used as a resin used for obtaining a resin-clad fabric, and the present invention has been completed.

That is, the present invention provides a polyester resin including, in a main chain skeleton, a dicarboxylic acid residue and a glycol residue, in which the dicarboxylic acid residue includes a terephthalic acid residue (a), an aliphatic dicarboxylic acid residue (b) having 6 to 12 carbon atoms, and a dimer acid residue or hydrogenated dimer acid residue (c), the glycol residue includes an ethylene glycol residue or diethylene glycol residue (d) and a branched aliphatic glycol residue (e) having 3 to 9 carbon atoms, and the polyester resin includes 30 to 50 mol % of the residue (a), 3 to 9 mol % of the residue (b), 1 to 5 mol % of the residue (c), 30 to 60 mol % of the residue (d), and 0.1 to 10 mol % of the residue (e), with respect to 100 mol % of the total amount of the residue (a) to the residue (e).

In addition, the present invention provides a method for producing a polyester resin including: causing a reaction between terephthalic acid (A), an aliphatic dicarboxylic acid (B) having 6 to 12 carbon atoms, a dimer acid or hydrogenated dimer acid (C), ethylene glycol or diethylene glycol (D), and a branched aliphatic glycol (E) having 3 to 9 carbon atoms, in which a content of (A) is 30 to 50 mol %, a content of (B) is 3 to 9 mol %, a content of (C) is 1 to 5 mol %, a content of (D) is 30 to 60 mol %, and a content of (E) is 0.1 to 10 mol %, with respect to 100 mol % of the (A) to (E).

In addition, the present invention provides a polyester resin composition including the polyester resin and a hydrolysis inhibitor.

In addition, the present invention provides a resin-clad fabric obtained by disposing a layer of the polyester resin or the polyester resin composition on a fiber fabric.

In addition, the present invention provides a method for producing a resin-clad fabric including applying the polyester resin or the polyester resin composition on a fiber fabric to form a layer of the polyester resin or the polyester resin composition on the fiber fabric.

Advantageous Effects of Invention

According to the present invention, it is possible to easily provide a polyester resin having excellent flexibility, transparency, solvent resistance, heat resistance, and water resistance. By using the polyester resin of the present invention, it is possible to provide a resin-clad fabric capable of being suitably used for obtaining products used outdoors such as tents.

DESCRIPTION OF EMBODIMENTS

Figure 1:
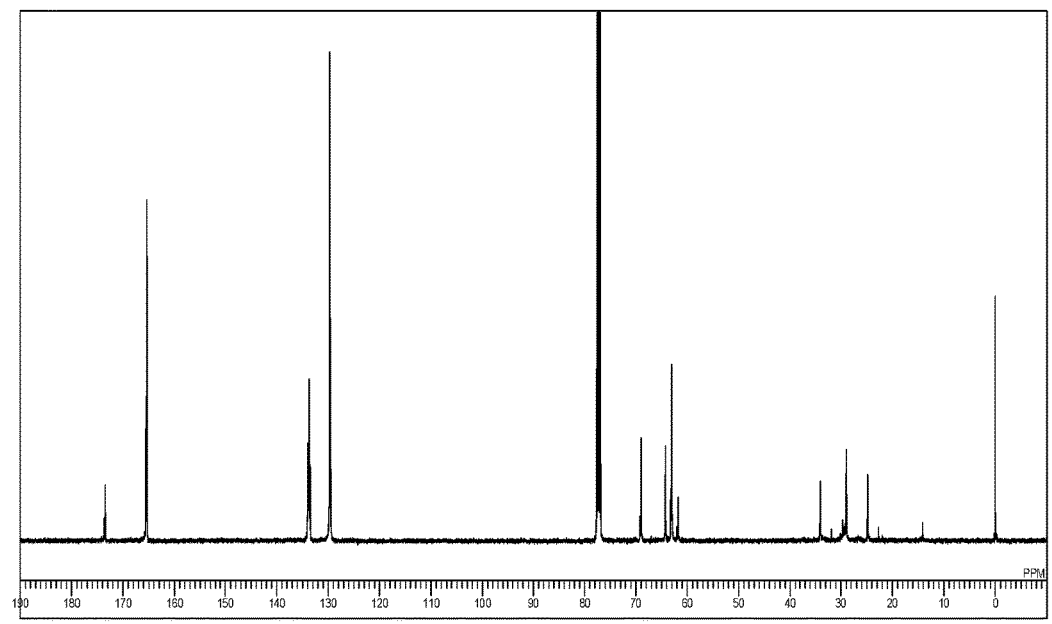
FIG. 1 is a chart of a $^{13}$C-NMR spectrum of a polyester resin (1) obtained in Example 1.

A polyester resin of the present invention includes a dicarboxylic acid residue and a glycol residue in a main chain skeleton, in which the dicarboxylic acid residue includes a terephthalic acid residue (a), an aliphatic dicarboxylic acid residue (b) having 6 to 12 carbon atoms, and a dimer acid residue or hydrogenated dimer acid residue (c), the glycol residue includes an ethylene glycol residue or diethylene glycol residue (d) and a branched aliphatic glycol residue (e) having 3 to 9 carbon atoms, and each of the residue (a) to the residue (e) is included in the following ranges with respect to 100 mol % of the total amount of the residue (a) to the residue (e).

Residue (a): 30 to 50 mol %
Residue (b): 3 to 9 mol %
Residue (c): 1 to 5 mol %
Residue (d): 30 to 60 mol %
Residue (e): 0.1 to 10 mol %

In the present invention, the "dicarboxylic acid residue" is referred to a structure in which OH is removed from dicarboxylic acid. In addition, the "glycol residue" is referred to a structure in which a hydrogen atom H is removed from glycol. Further, the number of carbon atoms in the dicarboxylic acid is the number not including carbon atoms of a carbonyl group.

It is necessary that the polyester resin of the present invention includes 30 to 50 mol % of the residue (a) with respect to 100 mol % of the total amount of the residue (a) to the residue (e). The content thereof smaller than 30 mol % is not preferable, because it is difficult to obtain a polyester resin having excellent heat resistance and solvent resistance. The content thereof greater than 50 mol % is not preferable, because it is difficult to obtain a polyester resin having excellent transparency and flexibility. The content of the residue (a) is more preferably 35 to 45 mol %.

It is necessary that the polyester resin of the present invention includes 3 to 9 mol % of the residue (b) with respect to 100 mol % of the total amount of the residue (a) to the residue (e). The content thereof smaller than 3 mol % is not preferable, because it is difficult to obtain a polyester resin having excellent flexibility. The content thereof greater than 9 mol % is not preferable, because it is difficult to obtain a polyester resin having excellent heat resistance. The content of the residue (b) is more preferably 4 to 7 mol %.

It is necessary that the polyester resin of the present invention includes 1 to 5 mol % of the residue (c) with respect to 100 mol % of the total amount of the residue (a) to the residue (e). The content thereof smaller than 1 mol % is not preferable, because it is difficult to obtain a polyester resin having excellent flexibility. The content thereof greater than 5 mol % is not preferable, because it is difficult to obtain a polyester resin having excellent heat resistance and solvent resistance. The content of the residue (c) is more preferably 1 to 3 mol %.

It is necessary that the polyester resin of the present invention includes 30 to 60 mol % of the residue (d) with respect to 100 mol % of the total amount of the residue (a) to the residue (e). The content thereof smaller than 30 mol % is not preferable, because it is difficult to obtain a polyester resin having excellent heat resistance and solvent resistance. The content thereof greater than 60 mol % is not preferable, because it is difficult to obtain a polyester resin having excellent transparency and flexibility. The content of the residue (d) is more preferably 35 to 55 mol %.

It is necessary that the polyester resin of the present invention includes 0.1 to 10 mol % of the residue (e) with respect to 100 mol % of the total amount of the residue (a) to the residue (e). The content thereof smaller than 0.1 mol % is not preferable, because it is difficult to obtain a polyester resin having excellent transparency and flexibility. The content thereof greater than 10 mol % is not preferable, because it is difficult to obtain a polyester resin having excellent heat resistance, solvent resistance, and water resistance. The content of the residue (e) is more preferably 1 to 8 mol %.

Examples of the residue (b) included in the polyester resin of the present invention include residues such as a residue of suberic acid, a residue of azelaic acid, a residue of sebacic acid, a residue of 1,11-undecane dicarboxylic acid, a residue of 1,12-dodecane dicarboxylic acid, and a residue of 1,14-tetradecane dicarboxylic acid. The polyester resin of the present invention may include one kind or two or more kinds of the residues (b).

From viewpoints of flexibility and water resistance, the polyester resin of the present invention is preferably an aliphatic dicarboxylic acid residue having 6 to 10 carbon atoms, more preferably a polyester resin including a residue of azelaic acid or a residue of sebacic acid, and even more preferably a polyester resin including a residue of azelaic acid and a residue of sebacic acid, as the residue (b). The polyester resin including a residue of azelaic acid and a residue of sebacic acid is preferably a polyester resin including 1 to 5 mol % of the residue of the azelaic acid with respect to 100 mol % of the total amount of the residue (a) to the residue (e) and 1 to 5 mol % of the residue of the sebacic acid with respect to 100 mol % of the total amount of the residue (a) to the residue (e), and more preferably a polyester resin including 2 to 4 mol % of the residue of the azelaic acid with respect to 100 mol % of the total amount of the residue (a) to the residue (e) and 1 to 3 mol % of the residue of the sebacic acid with respect to 100 mol % of the total amount of the residue (a) to the residue (e).

The residue (c) included in the polyester resin of the present invention is a residue of dimer acid or a residue of hydrogenated dimer acid. In the polyester resin of the present invention, a residue of hydrogenated dimer acid as the residue (c) is preferably included, from a viewpoint of obtaining a polyester resin having excellent heat resistance. The polyester resin of the present invention may include one kind or two or more kinds of the residues (c).

The dimer acid is dicarboxylic acid of a dimer obtained by polymerization of unsaturated fatty acid. Examples of the dimer acid include a polymer of unsaturated fatty acid such as linoleic acid, oleic acid, or linolenic acid, or drying oil fatty acid or semi-drying oil fatty acid obtained from tall oil, cottonseed oil, or soybean oil; and dicarboxylic acid having 36 carbon atoms obtained by polymerization (thermal polymerization) of carboxylic acid having 18 carbon atoms. The number of carbon atoms in the dimer acid is preferably 24 to 48, more preferably 28 to 44, even more preferably 32 to 40, and most preferably 36. That is, the dimer acid is most preferably dicarboxylic acid having 36 carbon atoms obtained by polymerization of carboxylic acid having 18 carbon atoms.

The residue (d) included in the polyester resin of the present invention is an ethylene glycol residue or a diethylene glycol residue. The polyester resin of the present invention is preferably a polyester resin including both of the ethylene glycol residue and the diethylene glycol residue, from a viewpoint of obtaining a polyester resin having excellent heat resistance and solvent resistance. The polyester resin including both of the ethylene glycol residue and the diethylene glycol residue is preferably a polyester resin including 25 to 45 mol % of the ethylene glycol residue with respect to 100 mol % of the total amount of the residue (a) to the residue (e) and 5 to 20 mol % of the diethylene glycol residue with respect to 100 mol % of the total amount of the residue (a) to the residue (e), and more preferably a polyester resin including 30 to 40 mol % of the ethylene glycol residue with respect to 100 mol % of the total amount of the residue (a) to the residue (e) and 7 to 13 mol % of the diethylene glycol residue with respect to 100 mol % of the total amount of the residue (a) to the residue (e).

Examples of the residue (e) included in the polyester resin of the present invention include a residue of neopentyl glycol, a residue of 1,2-propanediol, a residue of 1,2-butanediol, a residue of 1,3-butanediol, a residue of 2-methyl-1,3-propanediol, a residue of 3-methyl-1,5-pentanediol, a residue of 2-ethyl-2-butyl-1,3-propanediol, and a residue of dipropylene glycol. The polyester resin of the present invention is preferably a polyester resin including a branched aliphatic glycol residue having 4 to 7 carbon atoms, and more preferably a residue of neopentyl glycol and a residue of dipropylene glycol, as the residue (e), from a viewpoint of flexibility.

Particularly, a polyester resin including both of the residue of neopentyl glycol and the residue of dipropylene glycol is preferable, and in this case, a polyester resin including 0.1 to 3.0 mol % of the residue of neopentyl glycol and 3 to 9 mol % of the dipropylene glycol residue with respect to 100 mol % of the total amount of the residue (a) to the residue (e) is preferable, and a polyester resin including 0.5 to 2 mol % of the neopentyl glycol residue and 3 to 7 mol % of dipropylene glycol is more preferable.

Accordingly, the polyester resin of the present invention is preferably a polyester resin including 1 to 5 mol % of the azelaic acid residue and 1 to 5 mol % of the sebacic acid residue as the residue (b), 1 to 5 mol % of the hydrogenated dimer acid residue as the residue (c), 25 to 45 mol % of the ethylene glycol residue and 5 to 20 mol % of the diethylene glycol residue as the residue (d), and 0.1 to 3.0 mol % of the neopentyl glycol residue and 3 to 9 mol % of the dipropylene glycol residue as the residue (e), with respect to 100 mol % of the total amount of the residue (a) to the residue (e), and more preferably a polyester resin including 35 to 45 mol % of the residue (a), 2 to 4 mol % of the azelaic acid residue and 1 to 3 mol % of the sebacic acid residue as the residue (b), 1 to 3 mol % of the hydrogenated dimer acid residue as the residue (c), 30 to 40 mol % of the ethylene glycol residue and 7 to 13 mol % of the diethylene glycol residue as the residue (d), and 0.5 to 2 mol % of the neopentyl glycol residue and 3 to 7 mol % of the dipropylene glycol residue as the residue (e), with respect to 100 mol % of the total amount of the residue (a) to the residue (e).

From viewpoints of water resistance and solvent resistance of the polyester resin of the present invention, a polyester resin having a number average molecular weight obtained by gel permeation chromatography (GPC) method of 15,000 to 40,000 is preferable, and a polyester resin having a number average molecular weight of 20,000 to 35,000 is more preferable.

Here, a number average molecular weight (Mn) and a weight average molecular weight (Mw) are values in terms of polystyrene, based on gel permeation chromatography (hereinafter, abbreviated as GPC) measurement. Measurement conditions of the GPC are as follows.

[GPC Measurement Conditions]
Measurement device: "HLC-8220 GPC" manufactured by Tosoh Corporation
Column: Guard Column "HHR-H" (6.0 mm I.D.×4 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation+"TSK-GEL GMHHR-N" (7.8 mm I.D.×30 cm) manufactured by Tosoh Corporation Detector: ELSD ("ELSD2000" manufactured by Alltech Associates, Inc.)

Data processing: "GPC-8020 model II data analysis version 4.30" manufactured by Tosoh Corporation Measurement conditions: column temperature: 40° C.
Eluent: tetrahydrofuran (THF)
Flow rate: 1.0 ml/min
Sample: material obtained by filtering 1.0% by mass of a tetrahydrofuran solution in terms of a resin solid content with a microfilter (5 μl)

Reference sample: monodisperse polystyrene having a well-known molecular weight was used based on a measurement manual of the "GPC-8020 model II data analysis version 4.30".

(Monodisperse Polystyrene)
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation
"F-550" manufactured by Tosoh Corporation From a viewpoint of the flexibility, the polyester resin of the present invention is preferably a polyester resin having a glass transition temperature (Tg) of 5° C. to 30° C. and more preferably a polyester resin having a glass transition temperature of 10° C. to 25° C. In the present invention, the glass transition temperature (Tg) was measured under the following conditions.

[DSC Measurement Conditions]
Measurement device: METTLER TOLEDO DSC822e
Measurement temperature: −60° C. to 250° C.
Rate of temperature increase: 10° C./min
Atmosphere: nitrogen The polyester resin of the present invention may include a carboxylic acid residue other than the residue (a), the residue (b), and the residue (c), or a glycol residue other than the residue (d) and the residue (e), within a range not negatively affecting the effects of the present invention. Examples of the carboxylic acid residue other than the residue (a), the residue (b), and the residue (c) include an aromatic dicarboxylic acid residue other than the residue (a), and an aliphatic dicarboxylic acid residue.

Examples of the aromatic dicarboxylic acid residue other than the residue (a) include an isophthalic acid residue, an orthophthalic acid residue, a 2,6-naphthalenedicarboxylic acid residue, a 1,5-naphthalene dicarboxylic acid residue, a 5-sodium sulfoisophthalic acid residue, a 5-lithium sulfoisophthalic acid residue, a sodium sulfoterephthalic acid residue, a 4,4'-diphenylmethane dicarboxylic acid residue, a 4,4'-diphenyl ether dicarboxylic acid residue, a 4,4'-biphenyl dicarboxylic acid residue, and a 4,4'-stilbene dicarboxylic acid residue.

Examples of the aliphatic dicarboxylic acid residue include an aliphatic dicarboxylic acid residue having less than 6 carbon atoms, and an aliphatic dicarboxylic acid residue having greater than 12 carbon atoms. Examples of the aliphatic dicarboxylic acid residue having less than 6 carbon atoms include an oxalic acid residue, a malonic acid residue, a succinic acid residue, a glutaric acid residue, an adipic acid residue, and a pimelic acid residue, and examples of the aliphatic dicarboxylic acid residue having greater than 12 carbon atoms include a residue of 1,16-hexadecanedicarboxylic acid, and 1,18-octadecanedicarboxylic acid residue.

The polyester resin of the present invention may include a glycol residue other than the residue (d) and the residue (e), within a range not negatively affecting the effects of the present invention. Examples of glycol other than the residue (d) include an aliphatic diol residue having 3 to 9 carbon atoms, and specific examples thereof include linear aliphatic diol residues such as a 1,3-propylene glycol residue, a 1,4-butanediol residue, a 1,5-pentanediol residue, a 1,6-hexanediol residue, a 1,7-heptanediol residue, a 1,8-octanediol residue, and a 1,9-nonanediol residue. In addition, the polyester resin of the present invention may further include a residue of dimer diol within a range not negatively affecting the effects of the present invention. Dimer diol is glycol obtained by hydrogenation of a dimer component generally called dimer acid obtained by polymerization of unsaturated fatty acid. The dimer diol is obtained as a mixture of a geometrical isomer of the dimer diol having a branched structure or a cyclohexane ring. Examples of the dimer acid used as a raw material of the dimer diol include a polymer of unsaturated fatty acid such as linoleic acid, oleic acid, or linolenic acid, or drying oil fatty acid or semi-drying oil fatty acid obtained from tall oil, cottonseed oil, or soybean oil; and dicarboxylic acid having 36 carbon atoms obtained by polymerization (thermal polymerization) of carboxylic acid having 18 carbon atoms. The number of carbon atoms in the dimer diol is preferably 24 to 48, more preferably 28 to 44, and even more preferably 32 to 40.

Examples of the dimer diol include both-terminal aliphatic diol (CAS No. 256642-32-7, CAS No. 157961-21-6) obtained by hydrogenation of dimer acid which is a dimer of unsaturated fatty acid, and both-terminal aliphatic diol (CAS No. 7313-30-6) obtained by dimerization of 9-octadecen-1-ol of a Z body. A method for preparing the dimer diol is not limited thereto.

Examples of the representative dimer diol include product name: Pripol 2033 (manufactured by Croda International Plc), product name: KX-501 (manufactured by Arakawa Chemical Industries, Ltd.), and product name: Sovermol 650NS (manufactured by BASF) and Sovermol 918 (manufactured by BASF).

A polyester resin of the present invention can be easily obtained, for example, by causing a reaction between terephthalic acid (A), an aliphatic dicarboxylic acid (B) having 6 to 12 carbon atoms, a dimer acid or hydrogenated dimer acid (C), ethylene glycol or diethylene glycol (D), and a branched aliphatic glycol (E) having 3 to 9 carbon atoms, in which a content of (A) is 30 to 50 mol %, a content of (B) is 3 to 9 mol %, a content of (C) is 1 to 5 mol %, a content of (D) is 30 to 60 mol %, and a content of (E) is 0.1 to 10 mol %, with respect to 100 mol % of the total amount of the (A) to (E). Accordingly, the polyester resin of the present invention is a condensate using specific mol % of the (A) to (E).

The amount of the terephthalic acid (A) used is preferably 35 to 45 mol % with respect to 100 mol % of the total amount of the (A) to (E), from a viewpoint of obtaining a polyester resin having excellent heat resistance and solvent resistance. The amount of the aliphatic dicarboxylic acid (B) having 6 to 12 carbon atoms used is preferably 4 to 7 mol % with respect to 100 mol % of the total amount of the (A) to (E), from a viewpoint of obtaining a polyester resin having excellent transparency and flexibility. The amount of the dimer acid or the hydrogenated dimer acid (C) used is preferably 1 to 3 mol % with respect to 100 mol % of the total amount of the (A) to (E), from a viewpoint of obtaining a polyester resin having excellent flexibility. The amount of the ethylene glycol or the diethylene glycol (D) used is preferably 35 to 55 mol % with respect to 100 mol % of the total amount of the (A) to (E), from a viewpoint of obtaining a polyester resin having excellent heat resistance, solvent resistance, transparency, and flexibility. The amount of the branched aliphatic glycol (E) having 3 to 9 carbon atoms used is preferably 1 to 8 mol % with respect to 100 mol % of the total amount of the (A) to (E), from a viewpoint of obtaining a polyester resin having excellent heat resistance, solvent resistance, transparency, and flexibility.

Examples of the aliphatic dicarboxylic acid (B) having 6 to 12 carbon atoms include suberic acid, azelaic acid, sebacic acid, 1,10-decanedicarboxylic acid, 1,11-undecane dicarboxylic acid, 1,12-dodecanedicarboxylic acid, and 1,14-tetradecanedicarboxylic acid. The aliphatic dicarboxylic acid (B) having 6 to 12 carbon atoms may be used alone or in combination of two or more kinds thereof.

Among the aliphatic dicarboxylic acids (B) having 6 to 12 carbon atoms, branched aliphatic dicarboxylic acid having 4 to 7 carbon atoms is preferable and azelaic acid or sebacic acid is more preferable as the residue (b), from a viewpoint of obtaining a polyester resin having excellent flexibility and heat resistance. In a case of producing the polyester resin of the present invention, a polyester resin obtained by using azelaic acid or sebacic acid in combination is preferable, from a viewpoint of obtaining a polyester resin having excellent flexibility and heat resistance. In a case of using azelaic acid or sebacic acid in combination, it is preferable that 1 to 5 mol % of the azelaic acid is used with respect to 100 mol % of the total amount of the (A) to (E) and 1 to 5 mol % of the sebacic acid is used with respect to 100 mol % of the total amount of the (A) to (E), and it is more preferable that 2 to 4 mol % of the azelaic acid is used with respect to 100 mol % of the total amount of the (A) to (E) and 1 to 3 mol % of the sebacic acid is used with respect to 100 mol % of the total amount of the (A) to (E).

Among the dimer acid or hydrogenated dimer acid (C), the hydrogenated dimer acid is preferable, from a viewpoint of obtaining a polyester resin having excellent heat resistance. The polyester resin of the present invention may include one kind of the residue (c) or may include two or more kinds thereof.

In a case of producing a polyester resin of the present invention, a polyester resin obtained by using ethylene glycol and diethylene glycol in combination as the ethylene glycol or diethylene glycol (D) is preferable, from a viewpoint of obtaining a polyester resin having excellent heat resistance and solvent resistance. In a case of using the ethylene glycol and the diethylene glycol in combination, it is preferable that 25 to 45 mol % of the ethylene glycol is used with respect to 100 mol % of the total amount of the (A) to (E) and 5 to 20 mol % of the diethylene glycol is used with respect to 100 mol % of the total amount of the (A) to (E), and it is more preferable that 30 to 40 mol % of the ethylene glycol is used with respect to 100 mol % of the total amount of the (A) to (E) and 7 to 13 mol % of the diethylene glycol is used with respect to 100 mol % of the total amount of the (A) to (E).

Examples of the branched aliphatic glycol (E) having 3 to 9 carbon atoms include neopentyl glycol, 1,2-propanediol, 1,3-butanediol, 2-methyl-1,3-propanediol, 3-methyl-1,5-pentanediol, 2-ethyl-2-butyl-1,3-propanediol, and dipropylene glycol. Among these, branched aliphatic glycol having 5 to 6 carbon atoms is preferable, and neopentyl glycol and dipropylene glycol are more preferable, from a viewpoint of obtaining a polyester resin having excellent flexibility.

Specifically, the polyester resin of the present invention can be prepared, for example, by a method of putting 30 to 50 mol % of the (A), 3 to 9 mol % of the (B), 1 to 5 mol % of the (C), 30 to 60 mol % of the (D), and 0.1 to 10 mol % of the (E) with respect to 100 mol % of the total amount of the (A) to (E) into a reaction vessel, and allowing dehydration condensation in a nitrogen atmosphere at a reaction temperature of 180° C. to 260° C. The reaction time at this time is normally 20 to 30 hours.

As the vessel, a batch type producing apparatus such as a reaction vessel including a nitrogen introduction port, a thermometer, a stirring device, and a rectifying tube can be suitably used, for example. In addition, an extruder including a deaeration port, a continuous reaction apparatus, or a kneader can be used. Further, in a case of the dehydration condensation, the esterification reaction can be promoted by reducing pressure in a reaction system, if necessary. Furthermore, in order to promote the esterification reaction, various catalysts can also be added.

Examples of the catalysts include antimony oxide, barium oxide, zinc acetate, manganese acetate, cobalt acetate, zinc succinate, zinc borate, cadmium formate, lead monoxide, calcium silicate, dibutyltin oxide, butylhydroxyltin oxide, tetraisopropyl titanate, tetrabutyl titanate, magnesium methoxide, and sodium methoxide.

A polyester resin composition of the present invention includes the polyester resin of the present invention and a hydrolysis inhibitor. As the hydrolysis inhibitor, a carbodiimide compound can be preferably exemplified, for example.

Examples of the carbodiimide compound include bis(dipropylphenyl) carbodiimide, poly(4,4'-diphenylmethane carbodiimide), poly(p-phenylene carbodiimide), poly(m-phenylene carbodiimide), poly(tolyl carbodiimide), poly(diisopropylphenylene carbodiimide), poly(methyl-diisopropylphenylene carbodiimide), poly (triisopropylphenylene carbodiimide), and a monomer thereof. The carbodiimide compound may be used alone or in combination of two or more kinds thereof.

The amount of the hydrolysis inhibitor mixed is normally 0.1 to 2.0 parts by mass with respect to 100 parts by mass of the polyester resin.

In the polyester resin composition of the present invention, various additives such as a pigment, a lubricant, an ultraviolet absorber, an antioxidant, a plasticizer, a penetrating agent, a water repellent agent, an emulsifier, and a thickener can be mixed, within a range not negatively affecting the effects of the present invention.

A resin-clad fabric of the present invention is obtained by disposing a layer of the polyester resin or the polyester resin composition of the present invention on a fiber fabric. The resin-clad fabric of the present invention can be easily produced, for example, by applying the polyester resin or the polyester resin composition on a fiber fabric, and forming a layer of the polyester resin or the polyester resin composition on the fiber fabric.

Examples of the fiber fabric include a fabric formed of a synthesis fiber such as nylon, polyester, polyurethane, polyamide, rayon, or acryl; a fabric formed of a natural fiber such as cotton, wool, hemp, or silk; and a fabric obtained by mix-spinning or mix-weaving the synthesis fibers and/or the natural fibers. Among these, a fabric formed of a polyester fiber or a fabric including a polyester fiber is preferable, because the fabric adheres to the polyester resin or the polyester resin composition of the present invention in an excellent manner and is easy to be recycled.

In a case of applying the polyester resin or the polyester resin composition of the present invention onto the fiber fabric, a viscosity of the polyester resin or the polyester resin is decreased by performing heating to a temperature at which application can be performed. A heating temperature is normally 180° C. to 220° C. In addition, various methods can be used as a method of applying the polyester resin or the polyester resin composition of the present invention. Specific examples thereof include a coating method using a sprayer, a coating method using a bar coater, or coating using a brush. The amount of the polyester resin or the polyester resin composition applied is in a range so that a film thickness of a layer of the polyester resin or the polyester resin composition after the drying becomes 10 to 1,000 μm.

After applying the polyester resin or the polyester resin composition onto the fiber fabric, cooling is normally performed to obtain a cured resin layer. The cooling may be natural cooling under room temperature, or forced cooling performed by leaving the fiber fabric on which the polyester resin or the polyester resin composition has been applied in an environment of a low temperature. In addition, some resin of the resin-clad fabric of the present invention may permeate the fiber fabric.

EXAMPLES

Hereinafter, the present invention will be described in detail with reference to specific examples. In the examples, "parts" and "%" are based on mass, unless otherwise noted.

Example 1 (Polyester Resin)

Figure 2:
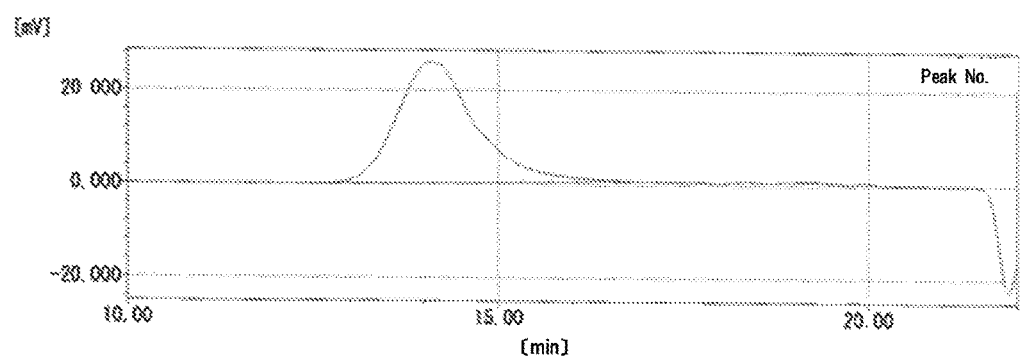
FIG. 2 is a chart of a GPC of the polyester resin (1) obtained in Example 1.

418 g (2.52 mol) of terephthalic acid, 63.6 g (0.32 mol) of sebacic acid, 70.6 g (0.13 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1) of the present invention. The number average molecular weight of the polyester resin (1) was 20,600 and the Tg thereof was 15° C. FIG. 1 shows a chart of a $^{13}$C-NMR spectrum of the polyester resin (1) and FIG. 2 shows a chart of a GPC of the polyester resin (1), respectively.

From the raw materials used for producing the polyester resin (1), it is clear that the amounts of the terephthalic acid residue (a), the aliphatic dicarboxylic acid residue (b) having 6 to 12 carbon atoms, the dimer acid residue or hydrogenated dimer acid residue (c), the ethylene glycol residue or diethylene glycol residue (d), and the branched aliphatic glycol residue (e) having 3 to 9 carbon atoms are respectively 40 mol %, 5 mol %, 2 mol %, 37 mol %, 15 mol %, and 1 mol % with respect to 100 mol % of the total amount of the residue (a) to the residue (e), and the polyester resin (1) corresponds to the polyester resin of the present invention. Table 1 shows the amounts (mol %) of the residue (a), the residue (b), the residue (c), the residue (d), and the residue (e) in the polyester resin (1).

Example 2 (Same as Above)

418 g (2.52 mol) of terephthalic acid, 35.5 g (0.19 mol) of azelaic acid, 25.5 g (0.13 mol) of sebacic acid, 70.6 g (0.13 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1) of the present invention. The number average molecular weight of the polyester resin (1) was 24,700 and the Tg thereof was 17° C. Table 1 shows the amounts (mol %) of the residue (a), the residue (b), the residue (c), the residue (d), and the residue (e) in the polyester resin (2) with respect to 100 mol % of the total amount of the residue (a) to the residue (e).

Example 3 (Same as Above)

418 g (2.52 mol) of terephthalic acid, 35.5 g (0.19 mol) of azelaic acid, 25.5 g (0.13 mol) of sebacic acid, 70.6 g (0.13 mol) of hydrogenated dimer acid "PRIPOL 1009 manufactured by Croda International Plc, the number of carbon atoms of 36"), 145 g (2.33 mol) of ethylene glycol, 60.1 g (0.57 mol) of diethylene glycol, 6.55 g (0.06 mol) of neopentyl glycol, 50.7 g (0.38 mol) of dipropylene glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1) of the present invention. The number average molecular weight of the polyester resin (1) was 23,300 and the Tg thereof was 18° C. Table 1 shows the amounts (mol %) of the residue (a), the residue (b), the residue (c), the residue (d), and the residue (e) in the polyester resin (3) with respect to 100 mol % of the total amount of the residue (a) to the residue (e).

Example 4 (Same as Above)

418 g (2.52 mol) of terephthalic acid, 10.5 g (0.06 mol) of isophthalic acid, 50.9 g (0.25 mol) of sebacic acid, 70.6 g (0.13 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1) of the present invention. The number average molecular weight of the polyester resin (1) was 22,100 and the Tg thereof was 22° C. Table 1 shows the amounts (mol %) of the residue (a), the residue (b), the residue (c), the residue (d), and the residue (e) in the polyester resin (4) with respect to 100 mol % of the total amount of the residue (a) to the residue (e).

Example 5 (Same as Above)

418 g (2.52 mol) of terephthalic acid, 35.5 g (0.19 mol) of azelaic acid, 25.5 g (0.13 mol) of sebacic acid, 70.6 g (0.13 mol) of hydrogenated dimer acid "PRIPOL 1009 manufactured by Croda International Plc, the number of carbon atoms of 36", 145 g (2.33 mol) of ethylene glycol, 73.5 g (0.69 mol) of diethylene glycol, 6.55 g (0.06 mol) of neopentyl glycol, 29.7 g (0.25 mol) of 3-methyl-1,5-pentanediol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1) of the present invention. The number average molecular weight of the polyester resin (1) was 28,300 and the Tg thereof was 15° C. Table 1 shows the amounts (mol %) of the residue (a), the residue (b), the residue (c), the residue (d), and the residue (e) in the polyester resin (5) with respect to 100 mol % of the total amount of the residue (a) to the residue (e).

TABLE 1

| | | | Example 1 | Example 2 | Example 3 | Example 4 | Example 5 |
|---|---|---|---|---|---|---|---|
| | Residue | Origin | Polyester resin | | | | |
| | | | (1) | (2) | (3) | (4) | (5) |
| Content of residue in main chain skeleton (mol %) | (a) | TPA | 40 | 40 | 40 | 40 | 40 |
| | Others | IPA | | | | 1 | |
| | (b) | AzeA | | 3 | 3 | | 3 |
| | (b) | SA | 5 | 2 | 2 | 4 | 2 |
| | (c) | H-DA | 2 | 2 | 2 | 2 | 2 |
| | (d) | EG | 37 | 37 | 37 | 37 | 37 |
| | (d) | DEG | 15 | 15 | 9 | 15 | 11 |
| | (e) | NPG | 1 | 1 | 1 | 1 | 1 |

TABLE 1-continued

|  |  | Example 1 | Example 2 | Example 3 | Example 4 | Example 5 |
|---|---|---|---|---|---|---|
|  |  |  |  | Polyester resin |  |  |
| Residue | Origin | (1) | (2) | (3) | (4) | (5) |
| (e) | DPG |  |  | 6 |  |  |
| (e) | 3MPD |  |  |  |  | 4 |

Note for Table 1
TPA: terephthalic acid
IPA: isophthalic acid
AzeA: azelaic acid
SA: sebacic acid
H-DA: hydrogenated dimer acid
EG: ethylene glycol
DEG: diethylene glycol
NPG: neopentyl glycol
DPG: dipropylene glycol
3MPD: 3-methyl-1,5-pentanediol Example 6 (Polyester Resin Composition and Resin-Clad Fabric)

100 parts of the polyester resin (1) and 1 part of a hydrolysis inhibitor (product name: CARBODILITE LA-1, manufactured by Nisshinbo Chemical Inc.) were put into a raw material introduction port (hopper) of a single screw extruder (L/D=25) having a screw outer diameter of 40 mm, which was provided with a T-die (manufactured by Toyo Seiki Seisaku-sho, Ltd., width of 30 mm, gap of 0.01 mm). In the single screw extruder, the screw was rotated under the conditions in which a temperature of the T-die becomes 200° C. to 220° C., thereby mixing 100 parts of the polyester resin (1) and the hydrolysis inhibitor to prepare the polyester resin composition of the present invention. The polyester resin composition was extruded from the T-die and applied onto a polyester fabric for clothes so as to have a thickness of 0.1 mm, and the resin composition was cooled, thereby obtaining the resin-clad fabric of the present invention.

By using the resin-clad fabric, the evaluations of flexibility, solvent resistance, heat resistance, and water resistance of the resin-clad fabric were performed by the methods described below. The results are shown in Table 2.

<Evaluation Method of Flexibility of Resin-Clad Fabric>

Figure 3:
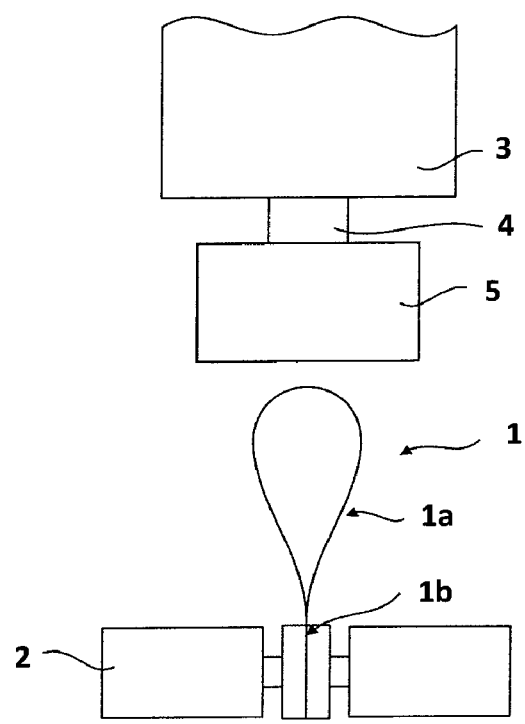
FIG. 3 is a diagram showing a state before the operation of a flexibility test device used in a case of evaluating flexibility of a resin-clad fabric in examples.
Figure 4:
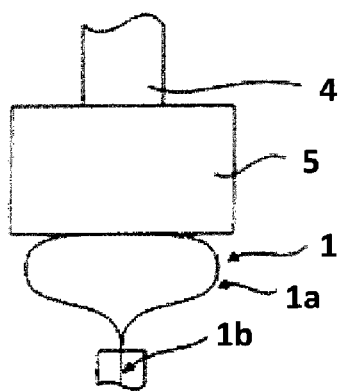
FIG. 4 is a diagram showing a state where the flexibility test device used in a case of evaluating flexibility of a resin-clad fabric in examples is operated.

The evaluation was performed by using a flexibility test device shown in FIGS. 3 and 4. FIG. 3 shows a state before the operation of the flexibility test device. FIG. 4 shows a state where the flexibility test device is operated.

A resin-clad fabric 1 cut out to have a width of 30 mm and a length of equal to or greater than 120 mm is folded to form a loop shape at the center, so that a resin coating surface faces the outer side, and accordingly, a loop portion 1a is formed and an overlapped portion 1b is formed with both ends. A length of the loop portion 1a is 80 mm and a length of the overlapped portion 1b is equal to or longer than 20 mm. The overlapped portion 1b is preferably held with tape or the like.

As shown in FIG. 3, the flexibility test device used in the flexibility test includes a moving member 3 which moves vertically, a load cell 4 which is attached to the moving member 3 and converts a load into an electric signal, a pressure element 5 which is attached to the load cell 4 and pressurizes the loop portion 1a of the resin-clad fabric, and a clamp 2 which fixes the overlapped portion 1b of the resin-clad fabric 1.

The clamp 2 supports the resin-clad fabric 1 in a state where the loop portion 1a protrudes to the upper side and the overlapped portion 1b is interposed. In this state, the moving member 3 moves downward. In a case where the moving member 3 moves downward, the load cell 4 and the pressure element 5 also move downward. As shown in FIG. 4, the pressure element 5 presses the loop portion 1a. A tester moves the moving member 3 downward to a predetermined position and investigates the maximum load (unit: newton N) in the movement range of the load cell 4. The test is performed five times for each sample and an average value of each sample is obtained. In this test, the smaller the maximum load (N) is, the more the flexibility of a resin-clad fabric is excellent.

<Evaluation Methods of Solvent Resistance>

Two evaluations described below were performed.

Evaluation of Solvent Resistance (1)

The resin-clad fabric was dipped into acetone and taken out after 1 minute. The resin-clad fabric was dried at room temperature for 1 hour, and the state of the resin layer was visually observed and evaluated based on the following criteria.

A: no changes at all

B: warpage of the resin-clad fabric is observed, but damages on the resin layer such as whitening or melting of the resin layer are not observed.

C: partial whitening is observed.

D: Whitening over all of the surfaces or melting of the resin layer is observed.

Evaluation of Solvent Resistance (2)

A test was performed based on "Dry Cleaning Process B Method of JIS L 1092: Testing Methods for Water Resistance of Textiles". The resin-clad fabric (500 mm×500 mm) and a supply cloth were put into a washing machine, washed with Industrial Gasoline No. 5 at 30° C. for 10 minutes, screen-dried, and dried at 70° C. for 30 minutes by using a tumble drier. The state of the resin layer was visually observed and evaluated based on the following criteria.

A: no changes at all

B: cracks or peeling of the resin layer is observed at two or less places.

C: cracks or peeling of the resin layer is observed at three or more and ten or less places.

D: cracks or peeling of the resin layer is observed at eleven or more places.

<Evaluation Method of Heat Resistance>

A drying test was performed based on "Drying Test Method (A-2 Method) of JIS L 0850: Test Method for Color Fastness to Hot Pressing". The resin-clad fabric was loaded so that the resin layer of the resin-clad fabric faces a cotton cloth side of a test stand, and a heated portion set to 150° C.

was superimposed at 4 kPa for 15 seconds. Then, the resin-clad fabric was left at room temperature so that the temperature of the resin-clad fabric becomes a temperature equal to or lower than 30° C. The resin-clad fabric and the cotton cloth were peeled off from each other, and a percentage of an area of the resin layer attached to the cotton cloth was obtained according to the following calculation equation. The smaller this value is, the more the heat resistance of a resin-clad fabric having is excellent.

Percentage (%) of the area of the resin layer attached to the cotton cloth=(attachment area/pressure contact area)×100 and the results were used for the evaluation of the transparency of the polyester resin of the present invention. The evaluation results are shown in Table 2.

Examples 6 to 10

Polyester resin compositions and resin-clad fabrics were obtained in the same manner as in Example 7, except that the polyester resins shown in Table 2 was used, respectively. The same evaluations as those in Example 7 were performed and the results thereof are shown in Table 2.

TABLE 2

|  | Example 6 | Example 7 | Example 8 | Example 9 | Example 10 |
| --- | --- | --- | --- | --- | --- |
| Polyester resin | (1) | (2) | (3) | (4) | (5) |
| Flexibility (N) | 3 | 2 | 1 | 1 | 1 |
| Solvent resistance (1) | A | B | B | A | B |
| Solvent resistance (2) | A | A | B | B | B |
| Heat resistance (%) | 0 | 0 | 10 | 8 | 6 |
| Water resistance (1) | A | A | B | A | B |
| Water resistance (2) | 0 | 0 | 0 | 0 | 0 |
| Transparency [haze (%)] | 1 | 0.8 | 0.3 | 0.6 | 0.7 |

<Evaluation Methods of Water Resistance>

The following two evaluations were performed.

Evaluation of Water Resistance (1)

Resistance to hydrolysis (hydrolysis resistance) in a case where the resin layer of the resin-clad fabric is exposed to moisture over a long period of time was evaluated by this evaluation. Specifically, the resin-clad fabric was put into a temperature and humidity testing chamber in which the temperature was 70° C. and the relative humidity was 90%, and an exposure test for 1,000 hours was performed. The changes in the resin layer on the resin-clad fabric after the test was visually observed and evaluated based on the following criteria.

A: no changes are observed from the resin layer, or whitened resin layer is observed, but the area thereof is 1% or lower of the whole area.

B: whitened resin layer is observed, but the area thereof is greater than 1% and less than 5% of the whole area. Partial whitening is observed.

C: the area of the whitened resin layer is 5% to 100% of the whole area. Partial or overall whitening is observed.

D: the resin layer is degraded and peeling is observed.

Evaluation of Water Resistance (2)

This evaluation is an evaluation regarding so-called "waterproof properties". A test was performed based on "Rain Test (Shower Test) A Method of JIS L 1092: Testing Methods for Water Resistance of Textiles". The resin layer was set in a test cup so as to face upwards, a shower was applied thereto, and a water leakage amount was measured. The smaller the water leakage amount is, the more waterproof properties are excellent.

In addition, in the producing method for obtaining the resin-clad fabric, a resin-clad release paper was obtained by using a release paper instead of the polyester fabric for clothes, in order to evaluate transparency of the polyester resin of the present invention. The resin layer was peeled off from this resin-clad release paper and a resin layer sample was produced. The haze of this resin layer sample was measured by using a haze meter NDH-2000 manufactured by Nippon Denshoku Industries Co., Ltd. based on "JIS K 7105: Testing Methods for Optical Properties of Plastics", Comparative Example 1 (Polyester Resin for Comparison)

261 g (1.58 mol) of terephthalic acid, 184 g (1.26 mol) of adipic acid, 70.6 g (0.13 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (1') for comparison. The number average molecular weight of the polyester resin (1') was 21,000 and the Tg thereof was 6° C. Table 3 shows the amounts (mol %) of the residue (a), the residue (b), the residue (c), the residue (d), and the residue (e) in the polyester resin (1') with respect to 100 mol % of the total amount of the residue (a) to the residue (e).

Comparative Example 2 (Same as Above)

314 g (1.89 mol) of terephthalic acid, 191 g (0.95 mol) of sebacic acid, 70.6 g (0.13 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (2') for comparison. The number average molecular weight of the polyester resin (2') was 20,000 and the Tg thereof was 4° C. Table 3 shows the amounts (mol %) of the residue (a), the residue (b), the residue (c), the residue (d), and the residue (e) in the polyester resin (2') with respect to 100 mol % of the total amount of the residue (a) to the residue (e).

Comparative Example 3 (Same as Above)

418 g (2.52 mol) of terephthalic acid, 13 g (0.06 mol) of sebacic acid, 212 g (0.38 mol) of hydrogenated dimer acid "PRIPOL 1009 manufactured by Croda International Plc, the number of carbon atoms of 36", 145 g (2.33 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (3') for comparison. The number average molecular weight of the polyester resin (3') was 17,800 and the Tg thereof was 1° C. Table 3 shows the amounts (mol %) of the residue (a), the residue (b), the residue (c), the residue (d), and the residue (e) in the polyester resin (3') with respect to 100 mol % of the total amount of the residue (a) to the residue (e).

Comparative Example 4 (Same as Above)

314 g (1.89 mol) of terephthalic acid, 36 g (0.19 mol) of azelaic acid, 25 g (0.13 mol) of sebacic acid, 71 g (0.13 mol) of hydrogenated dimer acid "PRIPOL 1009 manufactured by Croda International Plc, the number of carbon atoms of 36", 184 g (2.96 mol) of ethylene glycol, 100 g (0.95 mol) of diethylene glycol, 6.55 g (0.06 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (4') for comparison. The number average molecular weight of the polyester resin (4') was 10,500 and the Tg thereof was 40° C. Table 3 shows the amounts (mol %) of the residue (a), the residue (b), the residue (c), the residue (d), and the residue (e) in the polyester resin (4') with respect to 100 mol % of the total amount of the residue (a) to the residue (e).

Comparative Example 5 (Same as Above)

418 g (2.52 mol) of terephthalic acid, 24 g (0.13 mol) of azelaic acid, 38 g (0.19 mol) of sebacic acid, 71 g (0.13 mol) of hydrogenated dimer acid "PRIPOL 1009 manufactured by Croda International Plc, the number of carbon atoms of 36", 117 g (1.89 mol) of ethylene glycol, 67 g (0.63 mol) of diethylene glycol, 85 g (0.82 mol) of neopentyl glycol, and 0.04 g of tetraisopropyl titanate as a catalyst were put into a 1 liter four-neck flask equipped with a stirrer, a rectifying tube, a thermometer, and a nitrogen introduction port. Then, the mixture was slowly heated to 240° C. while stirring and subjected to an esterification reaction at 240° C. for 10 hours. After that, pressure in the flask was slowly reduced to 133 Pa (1 torr). After the pressure reached 133 Pa, the temperature in the flask was held at 240° C. for 12 hours to obtain a polyester resin (5') for comparison. The number average molecular weight of the polyester resin (5') was 25,500 and the Tg thereof was 7° C. Table 3 shows the amounts (mol %) of the residue (a), the residue (b), the residue (c), the residue (d), and the residue (e) in the polyester resin (5') with respect to 100 mol % of the total amount of the residue (a) to the residue (e).

TABLE 3

| | Residue | Origin | Comparative Example 1 | Comparative Example 2 | Comparative Example 3 | Comparative Example 4 | Comparative Example 5 |
|---|---|---|---|---|---|---|---|
| | | | \multicolumn{5}{c}{Polyester resin} |
| | | | (1') | (2') | (3') | (4') | (5') |
| Content of residue in main chain skeleton (mol %) | (a) | TPA | 25 | 30 | 40 | 30 | 40 |
| | (b) | AzeA | | | | 3 | 2 |
| | (b) | SA | | 15 | 1 | 2 | 3 |
| | Others | AA | 20 | | | | |
| | (c) | H-DA | 2 | 2 | 6 | 2 | 2 |
| | (d) | EG | 37 | 37 | 37 | 47 | 30 |
| | (d) | DEG | 15 | 15 | 15 | 15 | 10 |
| | (e) | NPG | 1 | 1 | 1 | 1 | 13 |

Note for Table 3
TPA: terephthalic acid
AzeA: azelaic acid
SA: sebacic acid
AA: adipic acid
H-DA: hydrogenated dimer acid
EG: ethylene glycol
DEG: diethylene glycol
NPG: neopentyl glycol Comparative Examples 6 to 10

Polyester resin compositions for comparison and resin-clad fabrics for comparison were obtained in the same manner as in Example 7, except that the polyester resins shown in Table 3 was used, respectively. The same evaluations as those in Example 7 were performed and the results thereof are shown in Table 4.

TABLE 4

|  | Comparative Example 6 | Comparative Example 7 | Comparative Example 8 | Comparative Example 9 | Comparative Example 10 |
| --- | --- | --- | --- | --- | --- |
| Polyester resin | (1') | (2') | (3') | (4') | (5') |
| Flexibility (N) | 2 | 1 | 1 | 15 | 1 |
| Solvent resistance (1) | D | D | D | A | D |
| Solvent resistance (2) | D | D | D | A | D |
| Heat resistance (%) | 35 | 63 | 55 | 0 | 60 |
| Water resistance (1) | D | C | B | A | C |
| Water resistance (2) | 0 | 0 | 0 | 0 | 0 |
| Transparency [haze (%)] | 0.2 | 0.3 | 0.6 | 85 | 0.3 |

REFERENCE SIGNS LIST

1: resin-clad fabric
1a: loop portion
1b: overlapped portion
2: clamp
3: moving member
4: load cell
5: pressure element

The invention claimed is:

1. A polyester resin comprising, in a main chain skeleton, a dicarboxylic acid residue and a glycol residue,
wherein the dicarboxylic acid residue includes a terephthalic acid residue (a), an aliphatic dicarboxylic acid residue (b) having to 12 carbon atoms, and a dimer acid residue or hydrogenated dimer acid residue (c),
the glycol residue includes an ethylene glycol residue or diethylene glycol residue (d) and a branched aliphatic glycol residue (e) having 3 to 9 carbon atoms, and
the polyester resin includes 30 to 50 mol % of the residue (a), 3 to 9 mol % of the residue (b), 1 to 5 mol % of the residue (c), 30 to 60 mol % of the residue (d), and 0.1 to 10 mol % of the residue (e), with respect to 100 mol % of the total amount of the residue (a) to the residue (e).

2. The polyester resin according to claim 1,
wherein the polyester resin includes 25 to 45 mol % of an ethylene glycol residue and 5 to 20 mol % of a diethylene glycol residue as the residue (d) with respect to 100 mol % of the total amount of the residue (a) to the residue (e).

3. The polyester resin according to claim 1,
wherein the residue (b) is an azelaic acid residue or a sebacic acid residue.

4. The polyester resin according to claim 1,
wherein the residue (c) is a hydrogenated dimer acid residue.

5. The polyester resin according to claim 1,
wherein the residue (e) is a neopentyl glycol residue or a dipropylene glycol residue.

6. The polyester resin according to claim 5,
wherein the residue (e) is the neopentyl glycol residue and the dipropylene glycol residue, and the polyester resin includes 0.1 to 3 mol % of the neopentyl glycol residue and 3 to 9% mol of the dipropylene glycol residue with respect to 100 mol % of the total amount of the residue (a) to the residue (e).

7. The polyester resin according to claim 1,
wherein the polyester resin includes 1 to 5 mol % of an azelaic acid residue and 1 to 5 mol % of a sebacic acid residue as the residue (b), 1 to 5 mol % of a hydrogenated dimer acid residue as the residue (c), 25 to 45 mol % of an ethylene glycol residue and 5 to 20 mol % of a diethylene glycol residue as the residue (d), and 0.1 to 3 mol % of neopentyl glycol residue and 3 to 9 mol % of a dipropylene glycol residue as the residue (e), with respect to 100 mol % of the total amount of the residue (a) to the residue (e).

8. The polyester resin according to claim 1,
wherein the polyester resin includes 35 to 45 mol % of the residue (a), 2 to 4 mol % of an azelaic acid residue and 1 to 3 mol % of a sebacic acid residue as the residue (b), 1 to 3 mol % of a hydrogenated dimer acid residue as the residue (c), 30 to 40 mol % of an ethylene glycol residue and 7 to 13 mol % of a diethylene glycol residue as the residue (d), and 0.5 to 2 mol % of a neopentyl glycol residue and 3 to 7 mol % of a dipropylene glycol residue as the residue (e), with respect to 100 mol % of the total amount of the residue (a) to the residue (e).

9. The polyester resin according to claim 1,
wherein a number average molecular weight obtained by gel permeation chromatography (GPC) method of the polyester resin is from 15,000 to 40,000.

10. The polyester resin according to claim 1,
wherein a glass transition temperature (Tg) of the polyester resin is from 5° C. to 30° C.

11. The polyester resin according to claim 1,
wherein the polyester resin is obtained by causing a reaction between terephthalic acid (A), an aliphatic dicarboxylic acid (B) having 6 to 12 carbon atoms, a dimer acid or hydrogenated dimer acid (C), ethylene glycol or diethylene glycol (D), and a branched aliphatic glycol (E) having 3 to 9 carbon atoms, in which a content of (A) is 30 to 50 mol %, a content of (B) is 3 to 9 mol %, a content of (C) is 1 to 5 mol %, a content of (D) is 30 to 60 mol %, and a content of (E) is 0.1 to 10 mol %, with respect to 100 mol % of the total amount of the (A) to (E).

12. A method for producing a polyester resin, comprising:
causing a reaction between terephthalic acid (A), an aliphatic dicarboxylic acid (B) having 6 to 12 carbon atoms, a dimer acid or hydrogenated dimer acid (C), ethylene glycol or diethylene glycol (D), and a branched aliphatic glycol (E) having 3 to 9 carbon atoms,
wherein a content of (A) is 30 to 50 mol %, a content of (B) is 3 to 9 mol %, a content of (C) is 1 to 5 mol %, a content of (D) is 30 to 60 mol %, and a content of (E) is 0.1 to 10 mol %, with respect to 100 mol % of the total amount of the (A) to (E).

13. A polyester resin composition comprising the polyester resin according to claim 1 and a hydrolysis inhibitor.

14. A resin-clad fabric obtained by disposing a layer of the polyester resin according to claim 1 on a fiber fabric.

15. A method for producing a resin-clad fabric, comprising:

applying the polyester resin according to claim 1 on a fiber fabric to form a layer of the polyester resin on the fiber fabric.

16. A resin-clad fabric obtained by disposing a layer of the polyester resin composition according to claim 13 on a fiber fabric.

17. A method for producing a resin-clad fabric, comprising:

applying the polyester resin composition according to claim 13 on a fiber fabric to form a layer of the polyester resin composition on the fiber fabric.

* * * * *